United States Patent [19]

Nelson et al.

[11] Patent Number: 4,954,034
[45] Date of Patent: Sep. 4, 1990

[54] VIBRATORY FUEL FEEDER FOR FURNACES

[75] Inventors: Eric A. Nelson; Jere C. Nieminski; Joseph L. Durante, all of Erie, Pa.

[73] Assignee: Zurn Industries, Inc., Erie, Pa.

[21] Appl. No.: 843,296

[22] Filed: Mar. 24, 1986

Related U.S. Application Data

[63] Continuation-in-part of Ser. No. 657,876, Oct. 5, 1984, abandoned, which is a continuation-in-part of Ser. No. 374,525, May 3, 1982, abandoned.

[51] Int. Cl.$^5$ .............................................. B65G 49/00
[52] U.S. Cl. .................................... 414/156; 110/109; 414/174; 414/176; 414/161; 198/769
[58] Field of Search .............................. 414/174–176, 414/187, 195, 198, 301, 786, 161, 156; 110/108, 109, 113, 115, 172; 431/346; 222/199, 200; 198/769

[56] References Cited

U.S. PATENT DOCUMENTS

| | | | |
|---|---|---|---|
| 2,098,034 | 11/1937 | Funt et al. | 198/769 X |
| 2,214,740 | 9/1940 | Harrington | 110/109 X |
| 2,582,583 | 1/1952 | Bros | 414/176 |
| 4,326,469 | 4/1982 | Reschly | 414/174 X |

FOREIGN PATENT DOCUMENTS 8102007  7/1981  European Pat. Off. ............ 414/156

Primary Examiner—Frank E. Werner
Attorney, Agent, or Firm—Wayne L. Lovercheck; Charles L. Lovercheck; Dale Lovercheck

[57] ABSTRACT

A vibratory feeder in combination with a fuel fired furnace such as a coal fired steam generating boiler is disclosed. The vibratory feeder has a tray with a flat bottom in one embodiment and a step bottom in another and a hopper having vertical sides supported above the bottom so that the fuel in the hopper rests on the tray bottom and the vibration of the tray is transmitted into the stack of fuel thereby agitating it. The discharge end of the tray bottom directs the fuel from the feeder tray to the bladed distributor and water is directed onto the tray bottom to prevent caking of fuel on the discharge end.

9 Claims, 3 Drawing Sheets

VIBRATORY FUEL FEEDER FOR FURNACES

REFERENCE TO PRIOR APPLICATION

The present application is a continuation-in-part of application Ser. No. 657,826, filed Oct. 5, 1984, now abandoned, which was a continuation in part of application, Ser. No. 374,525, filed May 3, 1982 now abandoned.

BACKGROUND OF THE INVENTION

This invention relates to stoker mechanisms and more particularly to spreader type stokers. During the operation of spreader type stokers fuel is typically delivered intermittently by an intermittently operated feeding mechanism. Many such fuel feeding mechanisms for furnaces have been designed which involved sliding plates and push bars of various kinds, as well as intermittently moving belts or chain type conveyors. These mechanisms involve numerous relatively moving parts which wear rapidly due to the abrasive nature of coal dust. The clearances between bearing surfaces wear and progressively increase reducing the efficiency of the feeder which in turn reduces the overall efficiency of the furnace. The coal dust clogs up the feeder making frequent cleaning, repair and rebuilding the stoker necessary and forcing shutdowns and other procedures that detract from efficiency.

During the operation of spreader type stokers, the fuel is delivered intermittently by an intermittently operated feeding mechanisms, from which the coal falls upon a rotating spreader type element which strikes the falling coal and impels it into the combustion space where combustion occurs.

Various intermittent coal feeding mechanisms have been provided such as U.S. Pat. No. 2,163,825 to Bros where fuel is delivered from a hopper or feed spout to a feed plate where fuel is periodically shoved forwardly toward the furnace by means of a reciprocating feed shoe or other device. Each forward motion of the feed shoe shoves a quantity of fuel off the delivery end of the feed plate. As the fuel falls it is engaged by a bladed rotary spreader type element below the discharge end of the feed plate. The rotor blades of the spreader strike the falling particles of fuel and impel them into the combustion space.

In the operation of sprinkler stoker mechanisms the fuel does not fall constantly upon the rotor but is delivered to the rotor intermittently due to the reciprocating or intermittent motion of the feed shoe, or other intermittant apparatus. Accordingly, the rotor delivers fuel particles into the furnace in a cyclic manner. This intermittent feeding of fuel into the furnace causes fluctuation in the furnace draft, puffing out of the furnace, difficulty with draft control apparatus and to some degree, unfavorable combustion efficiency as combustion air is fed to the furnace at a constant rate.

The constant feed rate of air for combustion has offered the disadvantage that if the combustion air is sufficient in amount to effect complete combustion during the feeding cycle, the same rate of feed of air for combustion represents an excess when no coal is being fed. This has the net effect of increasing the average excess air passing through the furnace and a consequent decrease in carbon dioxide content in the flue gasses. There is no known practical way of varying combustion air cyclically to compensate for the cyclical feed of the fuel.

In U.S. Pat. No. 2,582,583 to Bros, the problem of attaining a reasonably constant rate of fuel injection into the furnace was addressed. This Patent discloses a stoker mechanism having a fuel feed plate provided with a deflectable, slideable or otherwise movable tip and an oscillatory feed shoe interconnected therewith. By changing the position of the tip after the fuel feeding stroke, additional fuel is delivered therefrom during the period when no fuel would otherwise be delivered. The structure reduces the duration of the non feeding periods but does not provide a continuous and steady stream of fuel to the furnace as will be provided in the present invention.

The type of feeder shown in the Bros Patent has inherent problems with coal dust getting between the numerous relatively moving parts of the feeder and clogging the feeder so that it has to be stopped frequently and cleaned which may be once every week. This is not only expensive and time consuming but it reduces the furnace efficiency. The parts wear out rapidly and the stoker has to be rebuilt. The stoker efficiency drops off progressively as its parts wear. Thus the stoker has to be stopped and the furnace fire interrupted or reduced while the stokers are being cleaned, repaired or rebuilt. The efficiency of the furnace is further reduced while the stoker is out of service for repair or rebuilding.

Other patents of interest include U.S. Pat. No. 2,065,552 to Beers which shows a reciprocating ram for feeding coal from a hopper. U.S. Pat. No. 4,326,469 to Reschly shows a multi-fuel feed distributor and U.S. Pat. No. 2,098,034 to Flint shows a vibratory feeder per se. No vibratory feeder has previously been used to feed solid fuel into a furnace.

Coal is typically stored outdoors. Coal is therefore typically wet and has caused problems when attempting to feed it with the various types of prior feeders. The problem is caused by quantities of clay that are mined with the coal. As there is no practical means to separate the clay, it is present in the hopper when the coal is being fed to the furnace. The wet clay can cause the coal to stick together in clumps and cause further fluctuation in the feed rate of coal, and can clog or arch over the hopper mouth. Applicant has discovered that utilizing a vibratory tray with a hopper with straight vertical sides avoids the problem which has always plagued the industry in feeding wet coal. Coal dust is extremely abrasive and causes excessive wear on relatively moving parts. The vibratory tray shakes the clumps apart and prevents clogging of the hopper mouth, resulting in a steady, even flow of fuel from the hopper to the furnace.

Air coming in through the auxiliary high pressure air duct projects fine particles of coal into the furnace.

An adjustable trajectory plate directs the coal falling from the end of the tray onto the rotors that feed the coal to the furnace. The adjustment of trajectory plate determines where the coal will strike the rotor and thus how far the fuel is thrown into the furnace.

SHORT STATEMENT OF THE INVENTION

Accordingly, the fuel feeder of the present invention includes a frame supporting a tray which is vibrated by means of an electric motor. A stream of water is directed onto the tray which runs forward. The vibration of the tray causes the water on the tray bottom to spread out and cover the entire width of the tray bottom as it travels toward the discharge end and prevents fuel and clay from caking on the tray bottom. The vibratory feeder has no closely spaced relatively moving parts and therefore is subjected to minimum clogging, wear, maintenance and less rebuilding. A hopper to deliver fuel to the tray is disposed generally above the tray. A rotor is provided below a discharge end of the tray to strike the coal falling from the discharge end of the tray and impel it into the combustion space of the furnace where combustion occurs.

Coal, as mined, contains quantities of clay mixed therewith which are not practical to separate from the coal. Coal that has been stored outdoors, is usually wet. Applicant has observed problems when feeding wet coal mixed with clay in the various types of feeders. Applicant has discovered that utilizing a vibratory tray to feed the coal from the hopper avoids the problem of coal caking on the tray which has always plagued the industry in feeding wet coal. Applicant prefers to use a vertical sided hopper which gives the most efficient feeding to the tray.

The combined vibratory feeder with the stoker virtually eliminates the traditional problems of rapid wear, high maintenance costs and interruption of boiler operation during maintenance. These problems are virtually eliminated by the vibratory feeder. The above mentioned problems are an expensive and wasteful consequence of pusher feeders.

Applicant has discovered that the heat from the furnace coming in contact with the wet clay which splatters as the chunks are moving along the vibratory tray. The intense heat tends to dry out the splattered clay and bake it onto the vibratory feeder. This material adhering to the feeder occurs in small amounts but gradually builds up to a size that will impede with the feeding of coal. To prevent this problem, applicant has found that providing a small amount of water on the tray and the furnace will maintains a sufficiently low temperature on the feeding tray that the clay will not be baked onto the tray.

It is an object of the invention to provide a feeder with an infinitely adjustable feed range from a few pounds per hour to a large number of pounds per hour.

Another object of the invention is to provide a vibratory feeder and spreader stoker combination.

Another object of the invention is to provide a fuel feeding system incorporating a vibrator and controls independent of the distribution system of the feeder.

Another object of the invention is to provide continuous fuel feed from a vibrating tray thereby eliminating ignition pulsations in the furnace.

Another object of the invention is to provide automatic control of feeder output in response to boiler load with local bias override to each feeder in the bank of feeders.

Another object of the invention is to provide agitation means for coal contained in a supply hopper to prevent blockage during the feeding process.

Another object of the invention is to provide a high pressure air system to propel coal fines into a furnace.

Another object of the invention is to provide a stoker and furnace combination that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

Other objects, features and advantages of the present invention will become more fully apparent from the following detailed description of the preferred embodiment, the apended claims and the accompanying drawings in which:

DETAILED DESCRIPTION OF THE PREFERRED EMBODIMENTS

Figure 1:
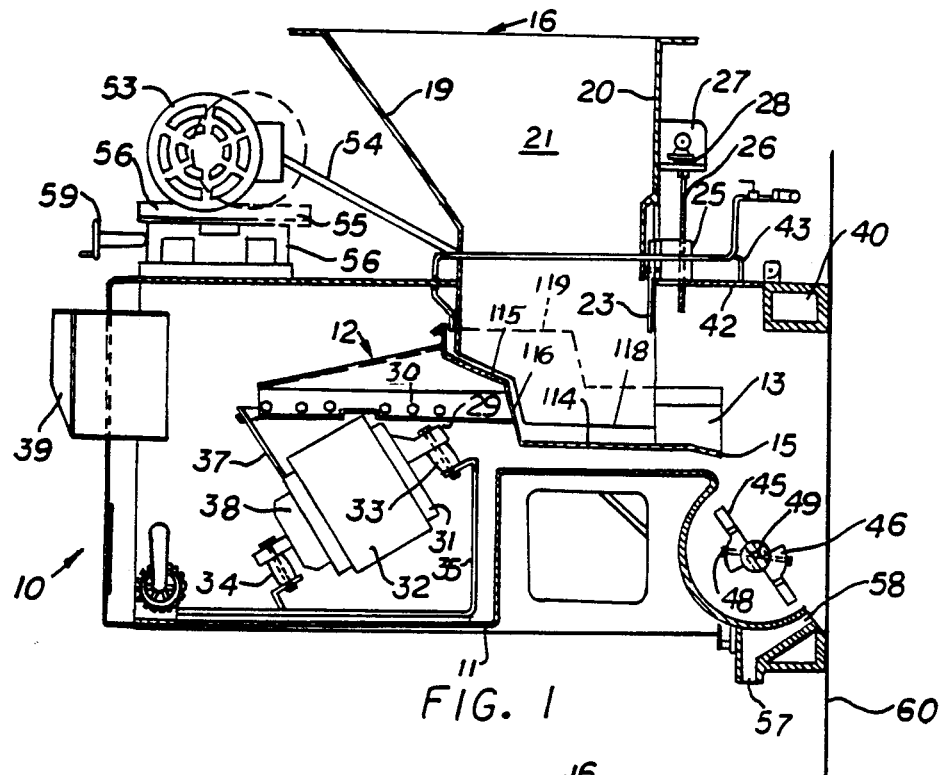
FIG. 1 is a longitudinal cross-sectional view of a preferred embodiment of the fuel feeder of the present invention.
Figure 2:
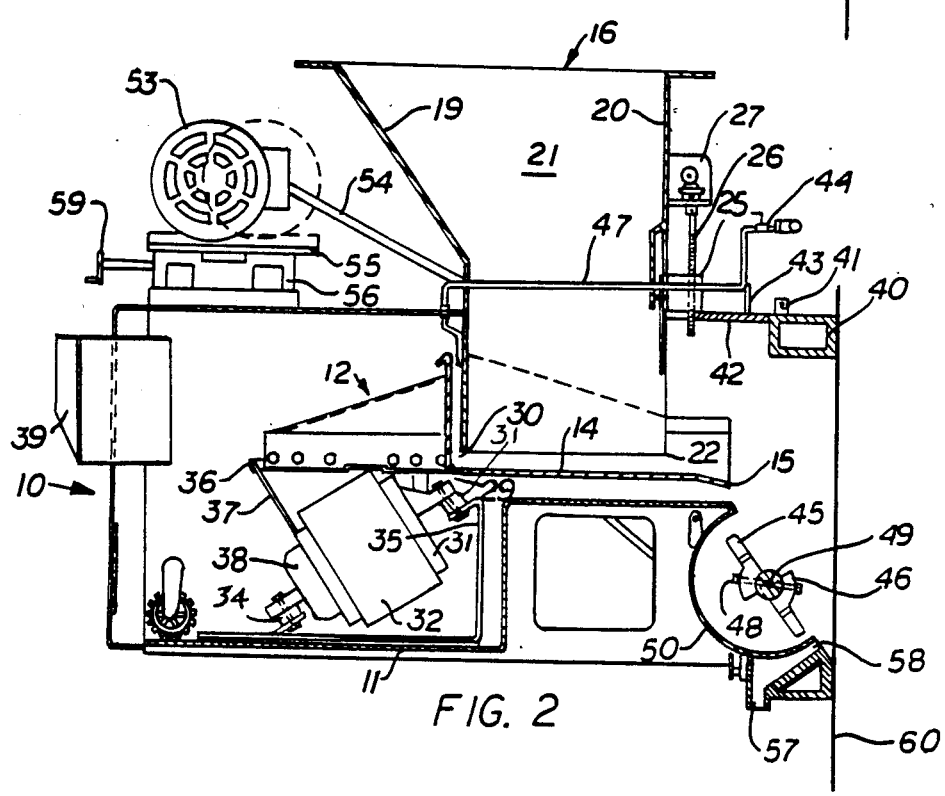
FIG. 2 is a cross sectional view of another embodiment of the feeder mechanism of the present invention.
Figure 3:
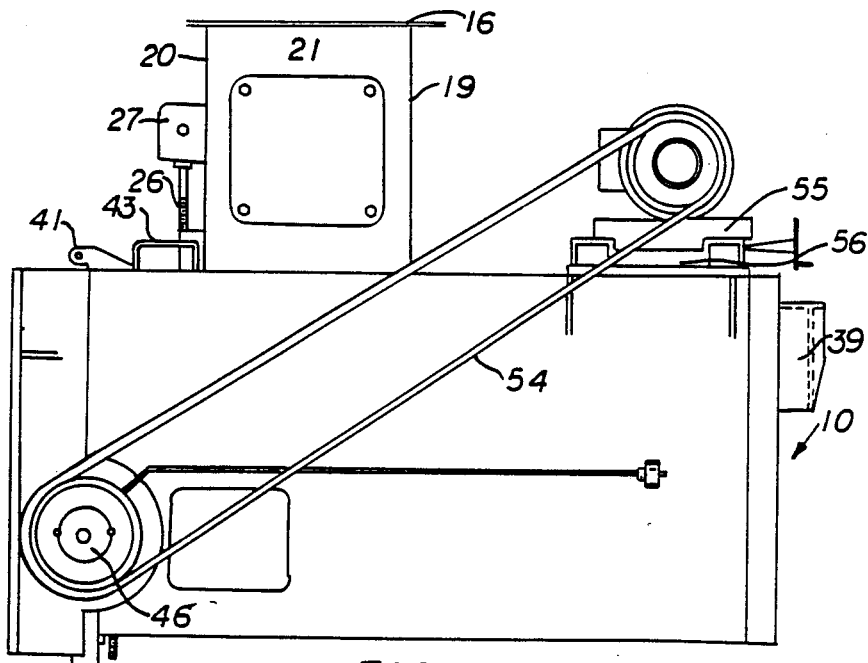
FIG. 3 is a left side view of the feeder mechanism of the present invention.
Figure 4:
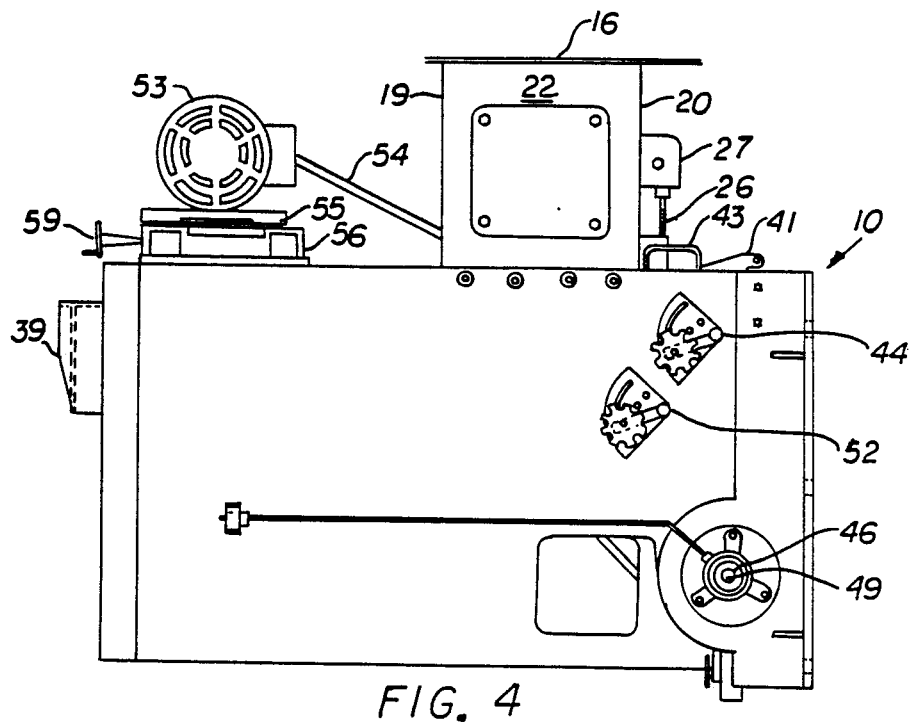
FIG. 4 is a right side view of the feeder mechanism of the present invention.
Figure 5:
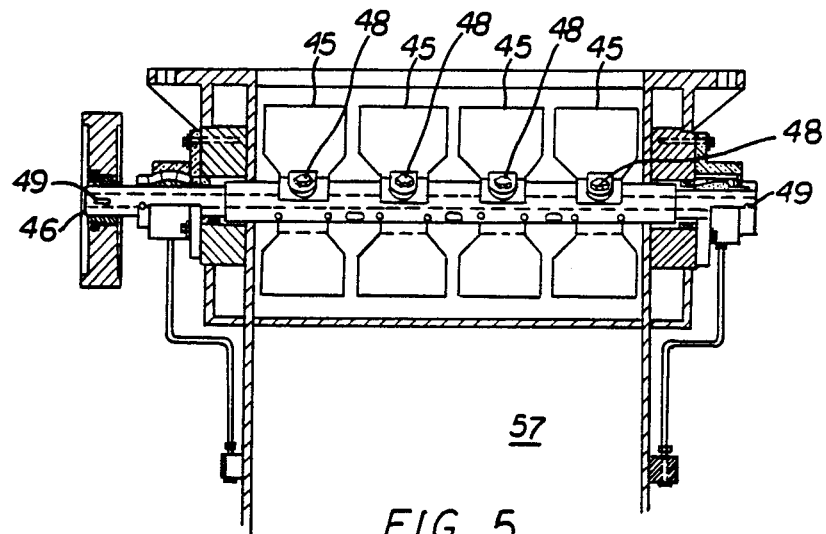
FIG. 5 is a cross-sectional view taken on line 5—5 of FIG. 2.

The preferred embodiment of the present invention is illustrated by way of example in FIGS. 1-7. With specific reference to FIG. 1 a feeding device 10 for feeding solid fuel to a furnace is disclosed. The feeding device has a frame 11 and a vibratory feeder 12 supported on the frame 11. The vibratory feeder 12 has a feeder tray or trough 13 having a relatively flat bottom 14 having a discharge end 15. The hopper 16 is supported above the flat bottom 14 and the hopper has sides and ends 19, 20, 21, 22, respectively. A suitable means is provided for attaching the feeder to a furnace 50. The feeder tray 13 is independently supported below the hopper 16 on the vibratory feeder 12. The gate 23 is attached to the nut 25 which receives the screw 26 which is in turn supported on the bracket 27 and the adjustment is made by rotating the bevel gears 28 whereby the gate 23 is adjusted up or down to change the effective size of the opening through side 20.

The tray 13 is supported on a bracket 29 which is fixed to the bottom 14 of the tray by bolts 30 and is fixed to the end 31 of the motor 32. The tray in the embodiment of FIG. 1 shows a tray having a bottom with a flat front part 114, a generally vertical rear part 115 and an intermediate part 116 integrally attached to front part 114 and rear part 115. Intermediate part 116 is inclined at a steeper angle than rear part 115. The lower edge 118 of the hopper 16 is disposed inside the side 119 of the tray. The tray in the embodiment of FIG. 2 bottom 14 has rear part 12 and a front part 15. The vibratory motor 32 is supported on resilient bushings 33 and 34 which are in turn supported on the bracket 35 which rests on the frame 11. The end 36 of the feeder is supported by leaf spring 37 on the end 38 of the motor 32. The motor 32 is a vibratory type of motor and may be operated for example on sixty cycle half wave ac current which is the type of electrical drive familiar to those skilled in the art.

The tray is vibrated by vibrator 32. The tray bottom is supported on the frame by resilient pads 31 and 34 and guided in its excursion by leaf springs 37. The tray is moved in an arcuate path controlled by leaf spring or resilient means 37 supporting said tray bottom on said frame, including means to control said bottom to vibrate in a path conforming generally to the arc of a circle, the path having components of movement which are (1) upward and rearward, lifting the material (2) downward and rearward, leaving the material airborne an instant as it falls onto the tray bottom and (3) upward and forward, moving the material upward and toward the discharge end. The movements 1, 2 and 3 are repeated rapidly at, for example, 60 cycles per second.

The electrical panel 39 is supported on the frame in a suitable manner.

The front end of the frame has the water jacket 40 fixed to it for protecting the fuel and feeder from the high temperature of the furnace which may reach temperatures of 2000 degrees Fahrenheit and the access cover 42 is connected to the water jacket frame at 41. Handle 43 provides a convenient means for opening the access door 42.

The water supply line 47 is mounted on the frame 11 and it has a shut off valve 44. The line 47 directs water onto the tray bottom between the rear and the front of the tray. The water spreads laterally and covers the entire tray bottom width as it runs forward over the tray bottom to the discharge end where part of the water vaporizes and prevents caking of fuel on the tray bottom.

The rotary distributor blade 45 is supported on an air cooled distributor shaft 46. The shaft 46 has the blades 45 attached to it by studs 48 which extend through the blades on one side and through the blades on the other side and are locked in place by the bolts 48. The shaft has a hollow 49 through which air may be passed.

The blades are supported in a hemicylindrical housing 50 which is open on the side facing the boiler shown in FIG. 1. The front most part of hemicylinder 50 is cooled by high pressure air through duct 57 and air from duct 57 discharges at 58. The amount of coal coming from the hopper to the feeder can be controlled by adjusting the gate 23 up or down to control the opening 24.

The shaft 46 is connected to the motor 53 which drives the distributor blades 45 through the belt 54. The motor can be adjusted forward or rearward to vary the shaft 46 speed through variable pitch pulley 58' by means of the adjustable motor base 55 which is slideably supported on the member 56 controlled by hand wheel 59 in a conventional manner.

Figure 6:
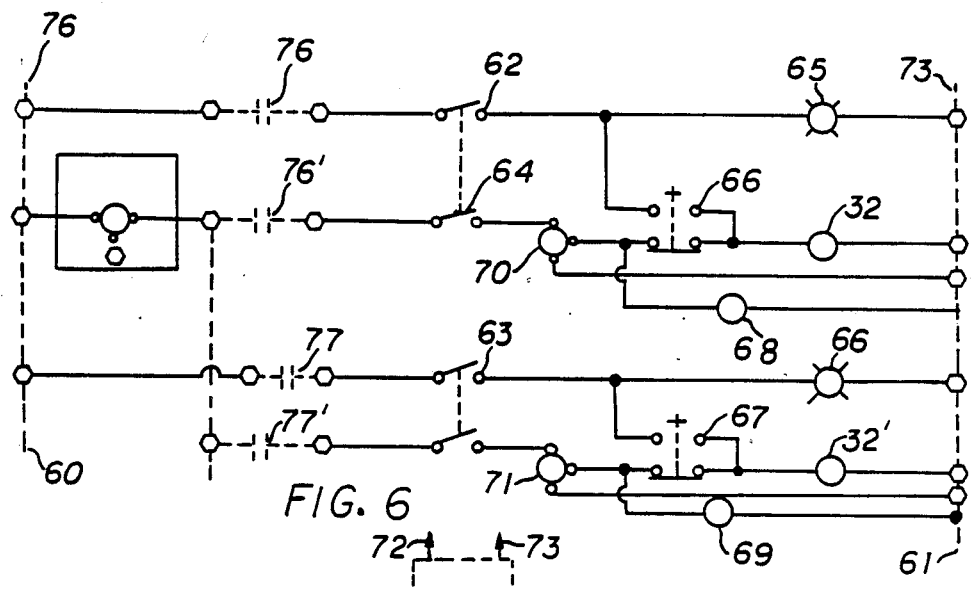
FIG. 6 is a schematic diagram illustrating the vibrators electrically connected to a power source in the present invention; and, FIG. 7 is a schematic diagram illustrating the electrical connection of the distributors according to the invention.
Figure 7:
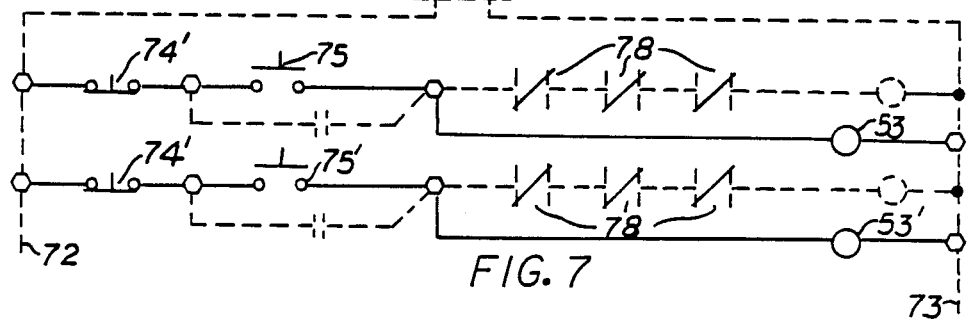

The control for the motors 53, 53' and vibrators 32, 32' in a bank of several feeders is shown in FIGS. 6 and 7. FIG. 6 shows a power supply wherein lines 72 and 73 which may be for example 120 volt 60 cycle AC is connected to the vibrators of feeders according to the invention. The push button starting controls are indicated at 62 and 63. Indicator lights 65 and 66 provide indication when the vibrators are energized. Suitable interlocks 76, 77, 76' and 77' connect the push button starting controls 62 and 63 to the line 72. Interlocks 76, 76', 77 and 77' are of a type familiar to those skilled in the art. The indicator lights 65 and 66 are actuated through push button starting controls 62 and 63 and the vibrators 32 and 32' are actuated through push button starting control 64 and 80 respectively. The vibrators 32 and 32' are connected to variable transformers 70 and 71 and the voltage selected on these transformers 70 and 71 is indicated on volt meters 68 and 69. The surge control switches 66 and 67 are intended to disconnect the vibrators 32 and 32' in case of a surge. The wiring diagram for the distributor motor group of several feeders is shown in FIG. 7. The circuit is connected to a suitable source of power 72 and 73 which may be 120 volt single phase. Motors 53 and 53' are connected to the power source by start switches 74 and 74' and stop switch 75 and 75' respectively. Distributor interlock switches 76, 76', and 77, 77' respectively are connected in series with the vibrators 32 and 32'. Overload switches 78 and 78' are connected in series with the motors 53 and 53'.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination a stoker for feeding solid fuel to a furnace and a furnace comprising,
   a vibratory feeder having a frame,
   a furnace,
   means connecting said vibratory feeder frame to said furnace,
   a vibratory feeder supported on said frame,
   said vibratory feeder comprising a tray having a bottom and electrical means to vibrate said tray,
   resilient means supporting said tray on said frame,
   said tray having a first end and a discharge end adapted to be positioned adjacent said furnace and a loading area adjacent the first end thereof,
   a solenoid operated movable free means to vibrate said tray and move said fuel relative to said tray to move fuel on said tray from said first end toward said discharge end,
   said vibrating means being supported on resilient means from said frame,
   said tray having an extension means oppositely directed from the tray discharge,
   said tray having a bottom surface engaging resilient means and non-resilient means extending from said vibrating means,
   a hopper means supported above said first end of said tray in vertical spaced relation thereto,
   and fuel moving means supported below said discharge end for receiving fuel from said discharge end of said tray and moving said fuel into said furnace,
   said fuel moving means comprises a rotary distributor supported below said discharge end of said tray,
   said rotary distributor comprising a shaft extending laterally of said feeder,
   said shaft having a plurality of blades thereon,
   said distributor blades being supported in a housing.

2. The stoker device recited in claim 1 wherein means to adjust fuel feed rate of fuel from said tray bottom are provided comprising:
   an opening in the lower end of the side of said hopper nearest said discharge end,
   a gate supported over said opening, and means to adjust said gate up and down to change the size of said opening thereby regulating the feed rate of fuel discharge from said feeder.

3. The recited in claim 1 wherein said hopper has sides and means is provided on said stoker to adjust feed rate comprising an opening in the lower end of a said side of said hopper nearest said discharge end, and a gate is supported over said opening, and means to adjust said gate up and down to change the size of said opening thereby regulating the feed rate of fuel discharge from said feeder.

4. The stoker recited in claim 3 wherein automatic electrical control is connected to said gate and is responsive to boiler load with local bias to override said feeder.

5. The stoker recited in claim 1 wherein said tray bottom is flat from one end thereof to the other, said vibratory feeder tray is supported on said frame by said resilient means and means to guide said tray vibrations in a path conforming generally to an arc of a circle whereby said bottom is moved upward and rearward lifting said fuel then downward and rearward leaving the material airborne as it falls to the bottom, then upward and forward moving the material up and toward the discharge end.

6. The stoker recited in claim 5 wherein said tray bottom has a first flat part remote from said discharge end inclined downward and toward a second flat part adjacent said discharge end disposed generally horizontally, said tray having a third part inclining towardly and forwardly at a steeper angle than said first part and attached to said first part of said bottom and attached to said second part of said bottom below said first plane.

7. The stoker recited in claim 5 wherein said tray bottom has spaced lateral sides extending upwardly therefrom and said hopper has spaced lateral sides extending downward into said tray and terminating above said bottom thereof.

8. The stoker recited in claim 1 wherein water is directed onto the discharge end of said tray bottom to prevent fuel from adhering to said bottom.

9. The stoker recited in claim 1 wherein said vibratory feeder bottom is supported on said frame by said resilient means and means to guide said tray vibrations in a path conforming generally to a part of an arc of a circle whereby said bottom is moved upward and rearward lifting said fuel, then downward and rearward leaving the material airborne as it falls to the bottom, then upward and forward moving this material up and toward the discharge end.

* * * * *

UNITED STATES PATENT AND TRADEMARK OFFICE
CERTIFICATE OF CORRECTION

PATENT NO. : 4,954,034
DATED : September 4, 1990
INVENTOR(S) : Eric A. Nelson; Jere C. Nieminski; Joseph L. Durante It is certified that error appears in the above—identified patent and that said Letters Patent is hereby corrected as shown below:

ON TITLE PAGE:
[75] Inventors: Insert --Robert A. Santos--.

In claim 3, line 1, before "recited", please insert --stoker--.

Signed and Sealed this

Twenty-fifth Day of February, 1992

Attest:

HARRY F. MANBECK, JR.

*Attesting Officer*   *Commissioner of Patents and Trademarks*